(12) United States Patent
Sherman et al.

(10) Patent No.: US 6,233,591 B1
(45) Date of Patent: May 15, 2001

(54) DROPPING HYPERLINK ONTO DOCUMENT OBJECT

(75) Inventors: Phil Sherman, Bellevue; Derek Shaw; Robert Scheld, both of Seattle, all of WA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 08/851,623

(22) Filed: May 6, 1997

Related U.S. Application Data

(60) Provisional application No. 60/017,905, filed on May 6, 1996.

(51) Int. Cl.[7] .................................................. G06F 17/21
(52) U.S. Cl. ........................ 707/501; 707/513; 345/326
(58) Field of Search ..................................... 707/501, 513, 707/530; 345/335, 326, 329, 333, 348

(56) References Cited

U.S. PATENT DOCUMENTS

| 4,982,344 | 1/1991 | Jordan et al. | 364/521 |
|---|---|---|---|
| 5,153,936 | 10/1992 | Morris et al. | 395/128 |
| 5,159,669 | 10/1992 | Trigg et al. | 395/159 |
| 5,204,947 | 4/1993 | Berstein et al. | 395/157 |
| 5,353,388 | 10/1994 | Motoyama | 395/117 |
| 5,500,929 | 3/1996 | Dickinson | 395/160 |
| 5,615,325 | 3/1997 | Peden | 395/326 |
| 5,724,595 * | 3/1998 | Gentner | 707/501 |
| 5,877,765 | 3/1999 | Dickman et al. | 345/349 |

OTHER PUBLICATIONS

User Manual for SoftQuad Hot Metal Pro 3.0, SoftQuad, 1996, pp. 119–125.
User's Guide Netscape Navigator Gold Personal Edition, Version 3.0, Netscape Communications Corporation, 1996, pp. 1–89.
"Stroud's Review of Netscape Gold", Stroud's CWSApps, http://cws.internet.com/reviews/netscape-netsgold3.html, Oct. 21, 1998.
Hawn, Matthew, "Cyberfinder: track internet URLs via the finder"*Macworld*, vol. 13, No. 3, p. 82, Mar. 1996.
*Laura Lemay*, Laura Lemay's Web Workshop: Front Page 97, Sams. Net, 1997, pp. 163–167, 153–156.*

* cited by examiner

*Primary Examiner*—Stephen S. Hong
(74) *Attorney, Agent, or Firm*—Fish & Richardson P.C.

(57) ABSTRACT

A method of creating document hyperlinks that allow a user to jump to another object or page within the same document or in another document all together—either on a local storage device, or on a remote storage device over a local area network, private wide area network, or the Internet. Hyperlinks that access a document from the Internet are called URL hyperlinks. A URL hyperlink in accordance with the present invention can be created as a new object (e.g., a graphics figure or text) or assigned to an existing object. With a figure-based hyperlink, a user can click anywhere within the figure's bounding box area to invoke a jump to the designated destination. In the preferred embodiment, with a text-based URL hyperlink, a jump will be invoked only when the user clicks on the specific characters that are associated with the URL hyperlink.

10 Claims, 2 Drawing Sheets

DROPPING HYPERLINK ONTO DOCUMENT OBJECT

RELATED APPLICATION

This application is related to co-pending U.S. patent application Ser. No. 08/851,622, entitled DOCUMENT INTERNET URL MANAGEMENT, assigned to the assignee of the present invention, filed on the same date as this application. This application claim benefit to provisional application 60/017,905 filed May 6, 1996.

BACKGROUND OF THE INVENTION

1. Field of the Invention

This invention relates to computer software, particularly for use in wide area networks, including the Internet.

2. Description of Related Art

The Internet worldwide web is an international electronic network comprising a vast number of interconnected electronic sites using common communication protocols. The architecture of the worldwide web (simply, "web") includes the use of web "pages" at a site to provide text, graphical, audio, and video information to users accessing that site. Selectable information is typically indicated by means of text or graphical images (e.g., icons or bitmapped images) which are associated with remote address pointers known as Universal Resource Locators (URL's), typically having the following form: "http://www.adobe.com".

Selection of text, an icon, or an image having a URL causes the user's program to access the web page designated by the URL. In addition, objects (e.g., data files, images, video clips, etc.) within a web page can also be assigned URL's, such that selection of the associated text, icon, or image causes the object to be transferred (downloaded) to the user's computer for playback or storage.

Modern "electronic documents" comprise text, format and control codes, and embedded objects, such as figures (e.g., vector or bitmapped graphics images), audio clips, and/or video clips. In addition, some documents (for example, documents produced in WordPerfect 6.1 from Corel Corporation of Ontario, Canada) may include "hypertext" or "hyperlinks". Hyperlinks are areas in a document containing pointer information that a user can select (e.g., by "clicking" with a pointer device, such as a mouse), causing the current application (e.g., wordprocessor, spreadsheet, etc.) to "jump" to a new document or a different location in the current document.

The present invention is directed at extending the concept of hyperlinks to include URL's, and includes a convenient, easy to use method of creating URL hyperlinks.

SUMMARY OF THE INVENTION

The present invention embodies document hyperlinks that allow a user to jump to another object or page within the same document or in another document altogether either on a local storage device, or on a remote storage device over a local area network, private wide area network, or the Internet. Hyperlinks that access a document from the Internet are called URL hyperlinks.

A URL hyperlink in accordance with the present invention can be created as a new object (e.g., a graphics figure or text) or assigned to an existing object. With a figure-based hyperlink, a user can click anywhere within the figure's bounding box area to invoke a jump to the designated destination. In the preferred embodiment, with a text-based URL hyperlink, a jump will be invoked only when the user clicks on the specific characters that are associated with the URL hyperlink.

In the preferred embodiment, figure-based hyperlinks are signified by an icon or "badge" that appears in the lower left corner of a figure's bounding box. Text-based hyperlinks preferably are signified by using different text attributes and colors that the user defines—for instance, the user may want each hyperlink to be colored blue and underlined.

In the preferred embodiment, URL hyperlinks can be created three different ways:

Figure Select and Assign—the user can select a figure or text within a figure and open a dialog to enter a URL for the hyperlink to use.

Hyperlink Tool—the user can use a hyperlink tool from a Tool palette and draw an invisible rectangle around an area the user wishes to be a hyperlink. A dialog then opens to let the user define the URL to be used. The user can use this tool, for example, to define hot spots on a bitmap to create an image map having several URL hyperlinks.

Drag and Drop—a user can assign a URL hyperlink to an existing figure by dragging a URL link directly from a web browser and dropping the URL link on the figure. If the user drags and drops a URL link on an empty part of a document, a new text-based hyperlink figure is created using the text associated with the URL link as displayed in the web browser.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

The present invention embodies document hyperlinks that allow a user to jump to another object or page within the same document or in another document altogether either on a local storage device, or on a remote storage device over a local area network, private wide area network, or the Internet. Hyperlinks that access a document from the Internet are called URL hyperlinks.

Figure 1:
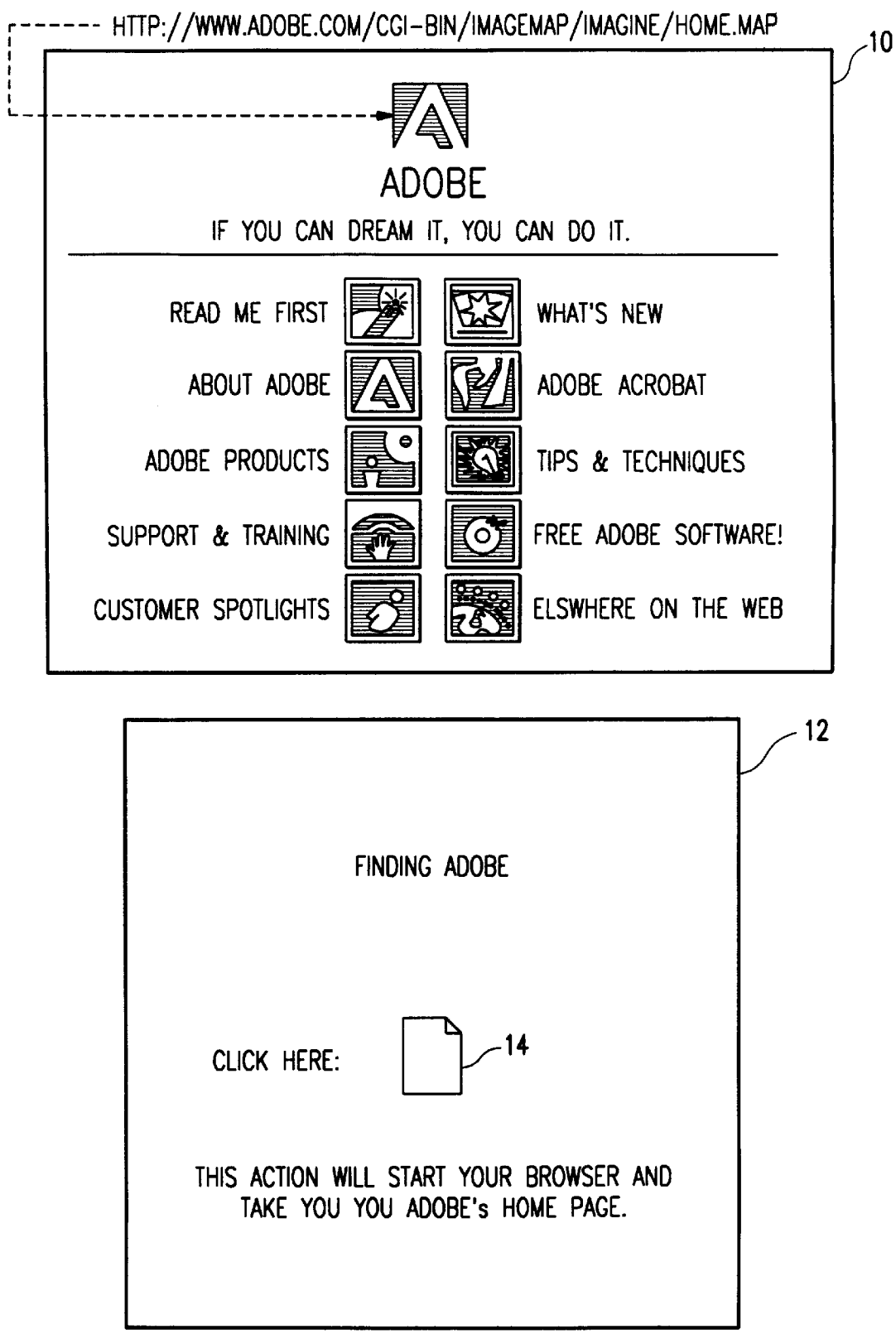
FIG. 1 is a graphical depiction of a browser page containing URL's, and a document page on which a URL hyperlink is to be created in accordance with the present invention.

FIG. 1 is a graphical depiction of a browser page 10 containing URL's, and a document page 12 on which a URL hyperlink is to be created in accordance with the present invention. The browser page 10 may be displayed by a convenient web browser program, such as Netscape Navigator™ from Netscape Communications Corporation of Mountain View, Calif. Shown is a portion of an actual web page displayed in May 1996 by the assignee of the present invention. The URL of the browser page 10 may be, for example, "http://www.adobe.com". The browser page 10 may have additional "active" objects, each with a URL. For example, the top-most icon on the browser page 10 has the URL shown in FIG. 1. In known fashion, a browser program can also display and/or copy a URL associated with an object.

The document page 12 is the active portion of a screen display of an exemplar program that uses the present invention (not shown are conventional tool bars, control buttons, menu bars, etc.). A text message is displayed that includes an associated URL hyperlink 14. Activation of the URL hyperlink 14 (e.g., by clicking with a mouse) will start an associated Internet-capable communications module or program, and access the URL of the browser page 10.

In known fashion, browser page 10 and document page 12 can be displayed in tiled or cascaded windows on a single monitor, such that the user may access either.

A URL hyperlink in accordance with the present invention can be created as a new object (e.g., a graphics figure or text) or assigned to an existing object. With a figure-based hyperlink, a user can click anywhere within the figure's bounding box area to invoke a jump to the designated destination. In the preferred embodiment, with a text-based URL hyperlink, a jump will be invoked only when the user clicks on the specific characters that are associated with the URL hyperlink.

Description of Flowchart

Figure 2:
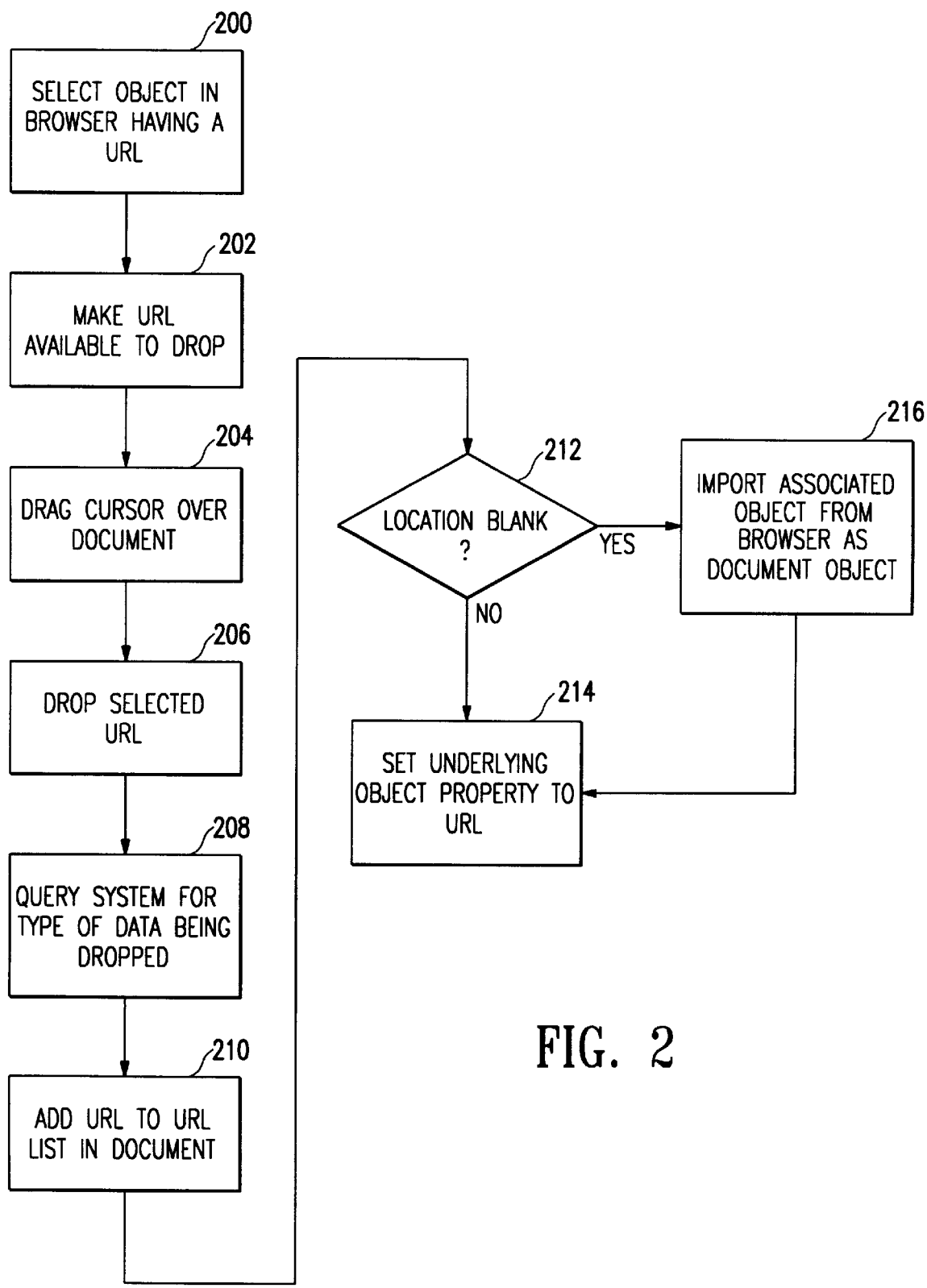
FIG. 2 is a flowchart showing a preferred method of creating a URL hyperlink by dragging and dropping.

FIG. 2 is a flowchart showing a preferred method of creating a URL hyperlink by dragging and dropping. While using a program implementing the invention, a user selects an object (e.g., an icon or graphics figure) from a browser page 10 having an associated URL (STEP 200). The URL, as provided by a browser program, is made available for dropping by the system software, in known fashion (STEP 202).

Using conventional techniques, the user "drags" (e.g., by holding down a mouse button and moving the mouse) the selected object to a document page 12 until the computer display cursor is positioned over an existing object, such as figure or text, or a blank area (STEP 204). For convenience, the cursor may be changed to indicate that a URL is being dragged. The user then drops the dragged object (e.g., by releasing the mouse button) (STEP 206).

At this point, the program implementing the invention queries the system software, in known fashion, for the type of data being dropped (in this case, a URL) (STEP 208). Having identified the data type as "URL", the URL is added to a list of URL bookmarks kept within or associated with the document page 12 (STEP 210). Bookmark lists are well-known, such as in the WordPerfect program mentioned above. In the preferred embodiment, a particular URL may be used more than once within a document, unlike conventional bookmarks.

The system software is also queried to determine the nature of the location on which a URL has been dropped (STEP 212). If the underlying location contains a pre-existing object, such as a figure or text, a "bookmark" property of the underlying object is set to the value of the dragged URL (STEP 214). Alternatively, an "invisible" bookmark code or bracketing pairs of codes are inserted within the document in close proximity to or surrounding the underlying object. The object is now hyperlinked to the URL. That is, selecting the URL hyperlinked object in the document (e.g., by clicking on it with a mouse) causes the underlying program to start an associated Internet-capable communications module or program, and use the URL address property of the object to retrieve the associated browser page 10 (or an object therein).

If the underlying location does not contain a pre-existing object (i.e., the location is blank) (STEP 212), then, in the preferred embodiment, the object or the text of the object of the selected item in the browser page 10 is also copied and imported into the document page 12 as a figure or figure text (STEP 216). The imported object then becomes an object of the document page 12. A "bookmark" property of the new object is set to the value of the dragged URL (STEP 214).

In the preferred embodiment, figure-based hyperlinks are signified by an icon or "badge" that appears in the lower left corner of a figure's bounding box. Text-based hyperlinks preferably are signified by using different text attributes and colors that the user defines—for instance, the user may want each hyperlink to be colored blue and underlined.

A number of the steps described above can be performed in different order to accomplish the same finction. For example, STEP 210 can be done after STEPS 212–216.

When URLs are dropped onto existing graphic figures, the resulting action is that of "applying" the URL hyperlink to the graphic. The advantage of this approach is that the drag-drop process allows the user to transfer the URL information to the target graphic without needing to separate the URL from its originating content. In other words, within the browser page 10, the URL exists as a property of an object of the browser page 10; transferring the URL to an object in the document page 12 does not require the URL to be separated visually from the browser page object. Thus, an object in the document page 12 takes on the same property as the object in the browser page 10. The URL as an independent visual entity need not exist. In addition, there is no need to create some default display proxy (e.g., an independent icon) to represent the URL.

URL hyperlinks can be created manually be permitting the user to select a figure or text within a figure and open a dialog to enter a URL as a property of the selected object. Another method is to permit the user to use a hyperlink tool from a Tool palette and draw an invisible rectangle around an area the user wishes to be a hyperlink. A dialog then opens to let the user define the URL to be used. The user can use this tool, for example, to define hot spots on a bitmap to create an image map having several URL hyperlinks.

While URL hyperlinks have been described, programs implementing the present invention may also use conventional intra-document and inter-document hyperlinks.

Implementation

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A computer-implemented method of creating a document hyperlink, comprising the steps of:
   receiving from a user an input gesture selecting a first object having an associated hyperlink;
   receiving from the user an input gesture dragging the hyperlink to a selected location on a document page;
   receiving from the user an input gesture dropping the hyperlink onto the selected location;
   determining, without further user input, whether the selected location includes a pre-existing document object or not, and:
     if so, setting a property associated with the pre-existing document object to the value of the dropped hyperlink, thereby linking the pre-existing document object to the first object;
     if not, copying at least part of the first object into the document page as a new document object and setting a property associated with the new document object to the value of the dropped hyperlink, thereby linking the new document object to the first object.

2. The method of claim 1, further including the step of adding the dropped hyperlink to a list of bookmarks associated with the document page after dropping the hyperlink.

3. The method of claim 1, wherein the first object is a browser page object.

4. The method of claim 1, wherein the hyperlink is a universal resource locator.

5. The method of claim 1, further including the step of visually marking the pre-existing or new document object to indicate that such document object is linked to the first object by means of the hyperlink.

6. A computer program, residing on a computer-readable medium, for creating a document hyperlink, comprising instructions for causing a computer to:
   receive a user input that selects a first object having an associated hyperlink;
   receive a user input that drags the hyperlink to a selected location on a document page;
   receive a user input that drops the hyperlink onto the selected location;
   determine, without further user input, whether the selected location includes a pre-existing document object or not, and:
     if so, set a property associated with the pre-existing document object to the value of the dropped hyperlink, thereby linking the pre-existing document object to the first object;
     if not, copy at least part of the first object into the document page as a new document object and set a property associated with the new document object to the value of the dropped hyperlink, thereby linking the new document object to the first object.

7. The program of claim 6, further comprising instructions for causing a computer to add the dropped hyperlink to a list of bookmarks associated with the document page after dropping the hyperlink.

8. The program of claim 6, wherein the first object is a browser page object.

9. The program of claim 6, wherein the hyperlink is a universal resource locator.

10. The program of claim 6, further comprising instructions for causing a computer to visually mark the pre-existing or new document object to indicate that such document object is linked to the first object by means of the hyperlink.

* * * * *

UNITED STATES PATENT AND TRADEMARK OFFICE
CERTIFICATE OF CORRECTION

PATENT NO. : 6,233,591 B1  
DATED : May 15, 2001  
INVENTOR(S) : Phil Sherman, Derek Shaw and Robert Scheld It is certified that error appears in the above-identified patent and that said Letters Patent is hereby corrected as shown below:

<u>Title page,</u>
Item [56], References Cited, after 5,724,595, please delete "3/1998" and insert -- 6/1999 -- therefor.

Signed and Sealed this

Twenty-second Day of January, 2002

Attest:

*Attesting Officer*

JAMES E. ROGAN
*Director of the United States Patent and Trademark Office*